Figure 1:
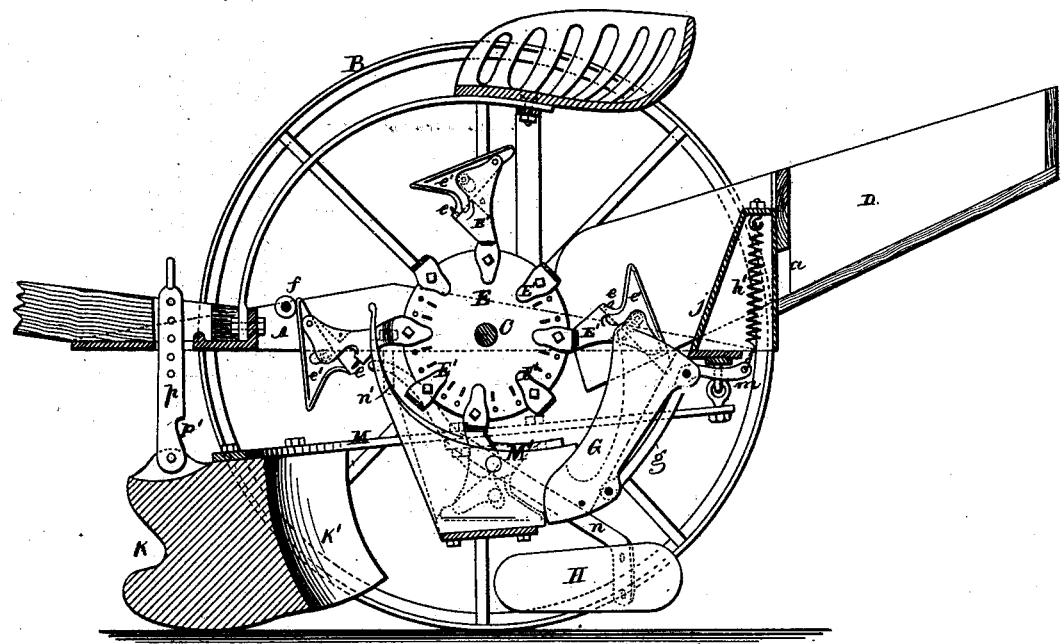

(No Model.) 2 Sheets—Sheet 1.

L. A. ASPINWALL.
Potato Planter.

No. 235,401. Patented Dec. 14, 1880.

Witnesses
Chas. H. Smith
Geo. T. Pinckney

Inventor
L. A. Aspinwall
per Lemuel W. Serrell
atty (No Model.)  
2 Sheets—Sheet 2.

L. A. ASPINWALL.
Potato Planter.

No. 235,401.  Patented Dec. 14, 1880.

Witnesses  
Chas. H. Smith  
Geo. T. Pinckney

Inventor.  
L. A. Aspinwall  
per Lemuel W. Serrell  
atty

UNITED STATES PATENT OFFICE.

LEWIS AUGUSTUS ASPINWALL, OF LOUDONVILLE, NEW YORK.

POTATO-PLANTER.

SPECIFICATION forming part of Letters Patent No. 235,401, dated December 14, 1880.

Application filed August 19, 1880. (No model.) Patented in England October 27, 1874, and July 30, 1878.

*To all whom it may concern:*

Be it known that I, LEWIS AUGUSTUS ASPINWALL, of Loudonville, in the county of Albany and State of New York, have invented an Improvement in Potato-Planting Machines, of which the following is a specification.

In 1874 I obtained a patent in Great Britain, No. 3,703, on a potato-planter, and July 30, 1878, I obtained another patent, No. 3,025. My present invention is described in the latter patent.

In my machine the frame is of a solid casting mounted upon a pair of traveling or ground wheels. The axle passes through the barrel of the frame, and the axle is thereby protected from dust and dirt.

The box or hopper is fastened at the back to carry the potatoes which are to be planted, and is provided with two small openings at the bottom, so as to feed the potatoes gradually in a small quantity to the mechanism for singling them from the mass.

The axle of the machine is provided with a disk which carries a series of spurs or points to perform this operation. They are made with an offset alternately in opposite directions, so that they form a double row, each working through a slotted concave for pressing the potatoes on the points, the object of which is to give more freedom for the potatoes to work down and make it easier for each concave. The spears are set nearly to, but slightly from, the radius of the arms which carry them, and are provided with a hinged piece fastened to the arm at or near the end thereof, so as to protect the point and facilitate the passage of the potato up the concave and on the points, also to prevent two from coming upon it at the same time, as the face of the hinged piece is slightly concave, and may be provided with a groove to hold the potatoes; or it may be made sharp to guide the potato up.

To prevent the potatoes from rolling when it is required to drop them upon manure previously put in by the drill, I use a pair of disk-wheels set at an angle with each other, so that their peripheries run against each other upon the manure or ground. Each disk is provided with a loose ring, which by its gravity drops sufficiently low to prevent the potatoes from rolling out when discharged from the points only as required by the advancing motion of the machine. These wheels are carried by a frame hinged at the rear of the machine, so as to rise and fall to the uneven surface they have to pass over.

Figure 2:
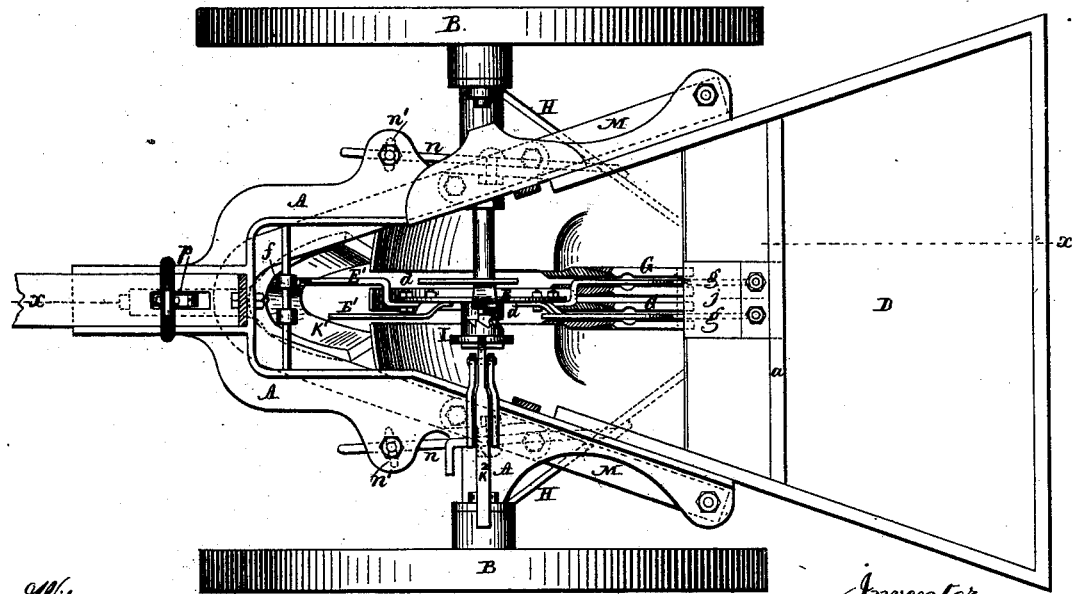

Figure 1 of the accompanying drawings is a vertical section through the machine, taken on the line $x\ x$, Fig. 2; Fig. 2, a plan of same; and Figs. 3 to 7 are detail views.

A is the frame of the machine, which is shown cast in one piece, and is mounted on traveling wheels B. The wheel-axle C passes through the barrel-bosses of the frame A, thus protecting the otherwise exposed parts of the axle C from dust or dirt.

D is the hopper or box containing the potatoes which are to be planted. It is formed with two openings, $a\ a$, at the bottom for the potatoes to fall down through and onto the mechanism for singling them from the mass. This mechanism consists of a disk, E, loose on the center of the axle C, and provided with spears or points $e$ on arms E' to perform this operation. Eight such arms E', with spears $e$, are shown here; but more or less may be used, according to the distance apart the potatoes are to be planted. The disk E is therefore formed with a number of holes for the fastening-bolts for the arms E', and for steady-pins on the said arms, as shown.

The center of the disk E is on one side formed with a boss having clutch-teeth which correspond with teeth on a clutch, I, which can slide along a feather on the axle C, and turns therewith. By means of the clutch-lever K² the clutch I can be put in or out of gear with the disk E, as required.

Four of the arms E' are cranked or formed with an offset to one side, so as to work in the one opening $d$, and the other alternate four with an offset to the opposite side, so as to work the other opening $d$. This will be clear from Fig. 2. The arms E' and spears $e$ work through two slotted concaves, G, at the back. These concaves are at their upper ends flexibly connected to the hopper D, for the purpose of adapting themselves to varying sizes of potatoes, by means of the bars $g$ and helical springs $h'$, which are inclosed in a box, $j$. The potatoes roll down the concaves G against the points of the spears as the latter ascend up against them. The arms E' are each provided with a hinged piece, e', the fulcrum-pins being near the outer end of the arms E', so as to protect the spear-points and facilitate the passage of the potato up the inner beveled edges of the concave G when spiked thereon; also to prevent two potatoes from coming upon it at the same time, as the face of the hinged piece e' is slightly concave.

The bevel of the concave edge is shown in Fig. 2, and also in dotted lines in Fig. 1.

f f are two rollers arranged on a spindle on the framing A. When a spear, on passing up the concaves G, spikes a potato, the latter will remain on the point of the spear until it comes round toward the front part of the machine, where the back or upper part of the hinged piece e' comes in contact with one of the rollers f, and thereby pushes the potato off the spear e; or, instead of rollers, a fixed friction-piece may be applied for tripping the hinged piece e'.

Figure 3:
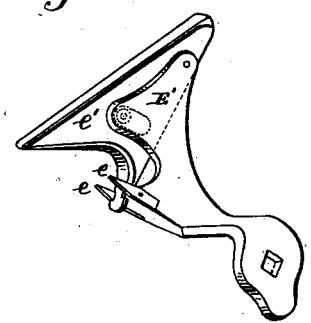

Fig. 3 is a perspective view of an arm, E', formed with two spears, e, instead of one.

H H are two wings for covering or closing the furrow after the potatoes have been dropped therein. These wings are carried by a bar, n, which is jointed to a bracket, M', on the frame M. This latter carries the plow K. The tail end of the bar n passes through an eye, n', bolted to the frame A, so as to allow the wings H to adjust themselves to the required position, according to the vertical position of the plow K, which can be adjusted by means of the bar p, provided with holes to take a pin. The bar p has also a hook, p', to take onto a projection on the frame, as shown, so as to raise the plow and wings clear of the ground when not required for work or in transport from place to place.

Figure 4:
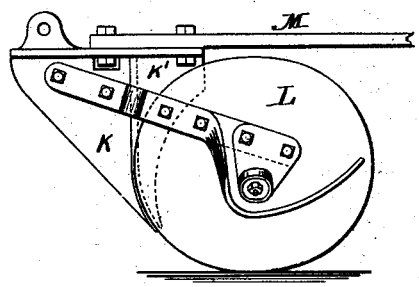
Figure 5:
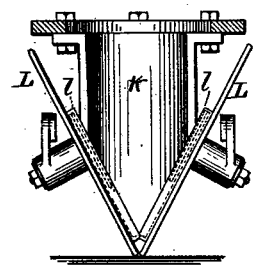

Fig. 4 is a side view, and Fig. 5 an end view, of the device for preventing the potatoes from rolling when it is required to drop them upon manure which has been deposited in the furrow made by the manure-drill.

L L are two disks, placed at an angle with each other, and free to revolve round their centers while rolling on the ground or manure. Each disk L has a loose ring, l, which, by its own gravity, drops down so far as to prevent the potatoes from rolling out when discharged from the points or spears e—that is, no more or farther than the advancing motion of the machine would require and admit. The disks L are carried by the frame M, which is hinged at m (see Fig. 1) to the rear part of the frame of the machine, so as to enable the disks L to ride on the ground and rise and fall to the uneven surface of the ground.

Figure 6:
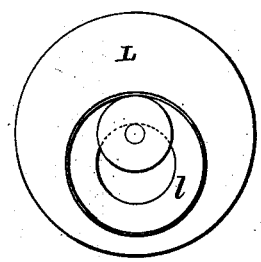
Figure 7:
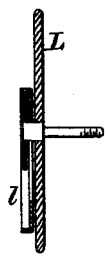

Fig. 6 is a face or end view, and Fig. 7 a section, of a disk, L, and ring l, showing more clearly how the latter hangs on the central boss of the former.

The part K, Fig. 4, which corresponds to the plow K, Fig. 1, does not in this case act as a furrow-former in the same sense as K, Fig. 1; but the concave rear part, K', serves the same purpose as the concave rear part, K', Fig. 1—viz., to guide the falling potatoes. The bottom point of the part K' closes the angular opening between the disks L; and

Having thus described and ascertained the nature of this my invention, I declare that I claim—

1. In a potato-planter, the hopper D, having converging sides and an inclined bottom, in combination with revolving lifting-spears and the concaves G, and the yielding attachment at the upper ends of said concaves, substantially as specified.

2. The combination, in a potato-planter, of the disk E, arms E', oblique spears e, hinged piece e', and roller f, substantially as set forth.

3. The disk E and the two rows of arms, spears, and hinge-pieces, in combination with the hopper and the yielding double concaves G, substantially as shown and described.

4. In combination with a potato-planter, the disk E, with two rows of arms, E', spears e, and hinge-pieces e', substantially as shown and described.

5. The combination, in a potato-planter, of the inclined disk-wheels L, loose rings l, and plow K, with its concave rear part, K', substantially as and for the purposes set forth.

Signed by me this 16th day of August, A. D. 1880.

L. AUGS. ASPINWALL.

Witnesses:
ARTHUR L. ANDREWS,
DAVID A. THOMPSON.